(12) United States Patent
Schumann et al.

(10) Patent No.: US 9,802,748 B2
(45) Date of Patent: Oct. 31, 2017

(54) METHOD AND CONTAINER FOR SECURE ENCLOSING AND SECURE TRANSPORT OF AT LEAST ONE ACCUMULATOR

(75) Inventors: Bernd Schumann, Rutesheim (DE); Niluefer Baba, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 912 days.

(21) Appl. No.: 14/113,851

(22) PCT Filed: Feb. 28, 2012

(86) PCT No.: PCT/EP2012/053307
§ 371 (c)(1),
(2), (4) Date: Jan. 16, 2014

(87) PCT Pub. No.: WO2012/146410
PCT Pub. Date: Nov. 1, 2012

(65) Prior Publication Data
US 2014/0124390 A1  May 8, 2014

(30) Foreign Application Priority Data

Apr. 27, 2011  (DE) .................. 10 2011 017 627

(51) Int. Cl.
| | | |
|---|---|---|
| B65D 85/00 | (2006.01) | |
| B65D 81/18 | (2006.01) | |
| H01M 2/10 | (2006.01) | |
| B65D 81/02 | (2006.01) | |

(52) U.S. Cl.
CPC ............. *B65D 81/18* (2013.01); *B65D 81/02* (2013.01); *H01M 2/1072* (2013.01); *Y10T 29/49826* (2015.01)

(58) Field of Classification Search
CPC ..... B65D 81/02; B65D 81/18; B60L 11/1822; B60L 11/1877; B60L 11/1879; B60S 5/06; H01M 2/1072
USPC .......... 206/703, 468; 180/68.5; 429/96, 100; 220/252, 345.1
See application file for complete search history.

(56) References Cited

U.S. PATENT DOCUMENTS 2,975,889 A * 3/1961 Brown ................ B65D 75/366
206/459.5
3,367,491 A * 2/1968 Dunham ............. B65D 75/366
206/468
4,314,008 A * 2/1982 Blake .................. H01M 10/486
429/120
5,270,136 A * 12/1993 Noland ............... H01M 2/1094
180/68.5

(Continued)

FOREIGN PATENT DOCUMENTS

| CN | 201112487 Y | 9/2008 |
|---|---|---|
| CN | 101337649 A | 1/2009 |

(Continued)

OTHER PUBLICATIONS

International Search Report for PCT/EP2012/053307, dated May 22, 2012.

*Primary Examiner* — Luan K Bui
(74) *Attorney, Agent, or Firm* — Norton Rose Fulbright US LLP; Gerard Messina

(57) ABSTRACT

A method and a container for secure enclosing and secure transport of an accumulator, in particular a lithium ion accumulator, includes a cover, a base plate and a rail.

21 Claims, 2 Drawing Sheets

(56) References Cited

U.S. PATENT DOCUMENTS

| | | | | |
|---|---|---|---|---|
| 5,271,178 A | * | 12/1993 | Eckard | A01M 3/00 220/345.4 |
| 5,360,307 A | * | 11/1994 | Schemm | B60K 1/04 104/34 |
| 5,620,057 A | * | 4/1997 | Klemen | B60K 1/04 180/65.1 |
| 5,944,177 A | * | 8/1999 | Nemoto | B65D 75/366 206/232 |
| 6,773,846 B2 | * | 8/2004 | Chen | H01M 2/1061 206/703 |
| 7,384,704 B2 | * | 6/2008 | Scott | B60H 1/00278 136/204 |
| 8,500,094 B2 | * | 8/2013 | Haslberger | B60K 1/04 180/68.5 |
| 2009/0288898 A1 | * | 11/2009 | Boegelein | B60L 11/1822 180/68.5 |
| 2012/0156539 A1 | * | 6/2012 | Honjo | B60K 1/04 429/100 |
| 2012/0321927 A1 | * | 12/2012 | Loo | B60K 1/04 429/100 |

FOREIGN PATENT DOCUMENTS

| | | |
|---|---|---|
| CN | 102019910 A | 4/2011 |
| DE | 19644048 | 5/1998 |
| DE | 19832195 | 1/2000 |
| EP | 2011761 | 7/2009 |
| EP | 2123526 | 11/2009 |
| EP | 2298691 | 3/2011 |

* cited by examiner

METHOD AND CONTAINER FOR SECURE ENCLOSING AND SECURE TRANSPORT OF AT LEAST ONE ACCUMULATOR

CROSS REFERENCE TO RELATED APPLICATION

The present application is the national stage entry of International Patent Application No. PCT/EP2012/053307, filed on Feb. 28, 2012, which claims priority to Application No. DE 10 2011 017 627.6, filed in the Federal Republic of Germany on Apr. 27, 2011.

FIELD OF INVENTION

The present invention relates to a method and to a container for secure enclosing and secure transport of an accumulator, in particular a lithium ion accumulator, which includes a cover, a base plate and a rail.

BACKGROUND INFORMATION

Lithium ion batteries (accumulators) are used as an energy store in a multitude of products. An example of this is the energy store in an electric motor vehicle. In the event an accumulator situated in such a motor vehicle is damaged or destroyed, for example, as the result of an accident, it must be safely enclosed and transported away, for example, by fire department personnel.

German Unexamined Patent Application No. DE 196 44 048 describes a device inside of which an accumulator placed for testing purposes is securely enclosed. However, this device severely limits the possible uses of the accumulator and is in essence adapted for use on a test bench.

SUMMARY

The subject matter of the present invention includes a container for secure enclosing and secure transport of at least one accumulator, in particular at least one lithium ion accumulator, including
 a cover and
 a base plate
 the cover being designed such that it is slidable smoothly onto the at least one accumulator and covers it,
 the base plate being capable of being slid underneath the accumulator,
 the cover and the base plate being connectable to one another,
 rails being provided with the aid of which the base plate is slidable underneath the accumulator,
 so that the accumulator is securely enclosed and transportable.

According to the present invention, the container includes a cover and a base plate for secure enclosing and secure transport of an accumulator. The cover is designed such that it is slidable smoothly onto the accumulator and covers it. This means that the cover as viewed from within may have the same shape as the accumulator itself. In addition, the base area of the cover may be slightly larger or much larger than the projecting surface of the accumulator in order to thereby achieve a smooth and easy sliding of the cover onto the accumulator. This means that the projecting surface is formed as a result of a projection of the contour of the accumulator in the direction in which the cover is slid over the accumulator. The base plate may also be slid underneath the accumulator. Thus, the accumulator is covered from the top and from the bottom. In addition, the cover and the base plate are connectable to one another. The connection allows the container to be securely transported in that it is held only by the cover or only by the base plate. Furthermore, in the event the accumulator explodes, it is securely enclosed and securely transportable. Also provided is at least one rail with the aid of which the base plate is slidable underneath the accumulator. This facilitates the placement of the base plate under the accumulator. The rails also support the exact placement of the base plate under the accumulator and under the cover.

According to one preferred exemplary refinement of the container, the rail is attached to the cover and/or to the accumulator, and/or to a base plate on which the at least one accumulator is situated, and/or to the base plate.

Attaching the rail to the cover results in a simple and precise placement of the base plate under the cover. The base plate is guided by the rail as it is slid via the rail under the cover and under the accumulator. Thus, it is possible even under extreme conditions, for example, vibrations which may occur when the accumulator is on fire, to precisely guide the base plate under the cover and under the accumulator.

According to one exemplary embodiment, a rail is attached to accumulators. This has the advantage that the rail may be utilized in the surroundings of the accumulator as it is being installed, for example, inside a motor vehicle. This enhances safety during the installation, removal and transport of the accumulator.

According to one preferred exemplary embodiment, the rail is attached to the base plate. Thus, the base plate may be slid under the cover while requiring no further steps. The cover is held within the rail as the base plate is slid under the cover. This prevents the base plate from sliding into an unfavorable position under the cover.

According to one further preferred exemplary embodiment of the container, the base plate includes at least two plates, at least one slide handle being provided on the base plate, and the at least two plates of the base plate being wedge-shaped so that they form a cuboid when pushed together.

Thus, the base plate includes at least two plates, the two plates when assembled forming the base plate. Because the base plate includes two plates, the first plate is slidable under the accumulator from one side of the rail and the second plate from the opposite side of the rail. The two plates may be slid under the accumulator successively at different rates. However, the two plates may also be slid under the accumulator simultaneously and at the same rate. The resulting advantage is that in the ideal case, the accumulator is not shaken at all or in the real case only slightly.

According to one exemplary embodiment, the two plates are exactly as long as or longer than the cover and the accumulator. The resulting advantage is that the two plates, when pushed in, completely cover the base area of the accumulator.

Preferably, the two plates of the base plate are wedge-shaped. When slid over each other they form a cuboid and thus the base plate. The resulting advantage of this is that the two plates may be easily slid over each other inside the rails. This forms an extremely stable base plate. One further advantage of the wedge-shape design of the two plates is that the two plates may be wedged inside the rail and thereby pressed against the rail. This ensures that the two plates are securely seated with no further steps or fittings required.

At least one slide handle may also be provided on the base plate. The slide handle makes it easy and simple to slide the base plate under the accumulator. This slide handle may extend upwardly at a right angle relative to the base plate, thus making it possible for a person or a robot, for example, to easily slide the base plate under the accumulator.

According to one preferred exemplary refinement, rollers are provided which are attached to the cover and/or to the base plate and/or to the at least two plates of the base plate, the rollers being attached such that the base plate rolls with the aid of the rollers as it is being slid underneath the accumulator.

Providing rollers on the cover allows for a particularly simple and precise guidance of the base plate under the accumulator. The frictional resistance is reduced to the frictional resistance of the rollers, and therefore to a minimum. The rollers guide the base plate under the cover, thereby supporting the action of the rails.

In one further exemplary embodiment, the rollers are provided on the base plate. In that way the base plate may be slid while lying on the ground. This makes the base plate easier to use and increases the precision with which the base plate is slid under the accumulator and the cover.

It is further advantageous if the rollers are attached to the back end of the two plates, as viewed in the sliding direction of a plate. The front end of the plate is raised with the aid of a lever, for example with the aid of a push lever. In this case, the rollers act like bearings and therefore as a pivot, about which the front end of the plate is raised.

Because the two plates are slid separately from one another on two opposite sides under the accumulator, the rollers attached to the two plates do not block the path to the rail. Hence the rollers may be of any size and may be adapted to the anticipated load.

It is further advantageous if one roller is provided on each side of the two plates. In this way, the two plates may be rotated and moved in a plane parallel to the ground.

The two plates form the base plate within the rail, a mobile base for the container being formed by the rollers attached to the two plates and by the two plates.

According to one preferred exemplary refinement of the container, the cover has at least one side that surrounds a space and at least one opening, the cover being designed to be rigid or flexible.

Because the cover has at least one side that surrounds a space and at least one opening, it is particularly easy to slide the cover over the accumulator. The space has various shapes which correspond advantageously to the shape of the accumulator to be covered.

According to one further exemplary embodiment, the cover forms part of a sphere, for example, the shape of a hemisphere. It therefore has only one side. This is advantageous in that pressure within the cover that occurs as a result of an accumulator explosion is particularly well distributed through the material of the cover.

According to another exemplary embodiment, the cover is cylindrically shaped. The cover has two sides in this case.

According to another exemplary embodiment, the cover is pyramid-shaped. The cover has three, four or multiple intersecting edges in this case. The sides may be flat, curved or of any arbitrary shape. The base area of the pyramidal space represents preferably the opening of the cover.

According to another exemplary embodiment, the cover is rectangular-shaped. The cover has five sides in this case.

According to one exemplary embodiment, the cover is designed to be rigid. In this case, the material of the cover is composed, for example, of a metallic material, in particular of steel. A cover is used that is sufficiently large depending on the size of the battery or the accumulator.

According to one exemplary embodiment, the cover is designed to be flexible. This may be accomplished, on the one hand, with the side of the cover being made of flexible materials. For example, the cover may be designed as a tent, whose tent walls are made of Teflon material. On the other hand, this may also be achieved with the side of the cover being made of rigid materials, the side faces of the cover being divided into smaller side panels which may be pulled apart on the rails located at the side. Similarly, the rails are likewise designed to be pulled apart.

According to one exemplary embodiment, the cover is designed to sever cables and hoses connected to the accumulator when the cover is being slid onto the accumulator.

According to one exemplary embodiment, the side of the cover is designed with sharp edges in the area of the side that forms the opening of the cover. Thus, a cover with a sharp-edged opening is formed. The cables and hoses connected to the accumulator are severed with the aid of this sharp-edged opening when the cover is slid over the accumulator. The action of the sharp-edged opening may be reinforced by the weight of the cover itself or by loads elsewhere on the cover directed toward the support surface of the cover.

According to one preferred exemplary refinement, at least one filter material is provided within the cover. The filter material may, for example, absorb gases, dusts and/or electrolyte quantities which form due to fire. In particular, as a result it is unnecessary to attach a suction device for suctioning off gases and dusts due to fire. In this case, the filter material preferably includes an activated carbon filter.

According to one preferred exemplary refinement, the cover and the base plate are connected via at least one connecting buckle.

According to one exemplary refinement, the connecting element is provided on the at least one side of the cover and/or at the opening of the cover.

According to one exemplary refinement, the cover and the base plate are connected manually and/or automatically.

The connecting element may be a buckle, for example. Moreover, the connecting element may be designed as a latch lock, a spring lock or a multi-point locking system. When the connection of the cover and base plate occurs manually, the user has control over the exact point in time the connection is to be made. When the connection of the cover and base plate occurs automatically, the connection engages precisely the moment the cover and the base plate are situated in the correct or perfect position relative to one another. According to one exemplary refinement, the positioning may be detected, for example, with the aid of sensors or magnets.

According to one preferred exemplary embodiment, a motor controlled from outside is provided to which the at least one slide handle is attached.

Providing a motor controllable from outside, to which the at least one slide handle is attached, allows the covering of the accumulator and the sliding of the base plate under the accumulator and under the cover to be completely remote controlled. This reduces the risk to humans in the surroundings of the critical accumulator. The former may operate the motor from far outside, for example, via radio or cable.

According to one preferred exemplary embodiment, the accumulator is located inside a motor vehicle.

A further subject matter of the present invention includes a method for secure enclosing and secure transport of at least one accumulator, in particular at least one lithium ion accumulator, in which
- a cover hood is slid onto the at least one accumulator,
- a base plate is slid underneath the at least one accumulator,
- cover and base plate are connected to one another,
- so that the at least one accumulator is securely enclosed and transportable.

This method makes it possible to securely enclose and therefore securely transport the accumulator. Even in a critical state, the accumulator may now be safely retrieved. The method may be employed regardless of the surroundings of the accumulator. Thus, it may be used, for example, in a research facility or in the middle of a street where, for example, an electric vehicle has come to a halt.

Exemplary embodiments of the present invention are described in greater detail below with reference to the accompanying drawings.

DETAILED DESCRIPTION

Figure 1:
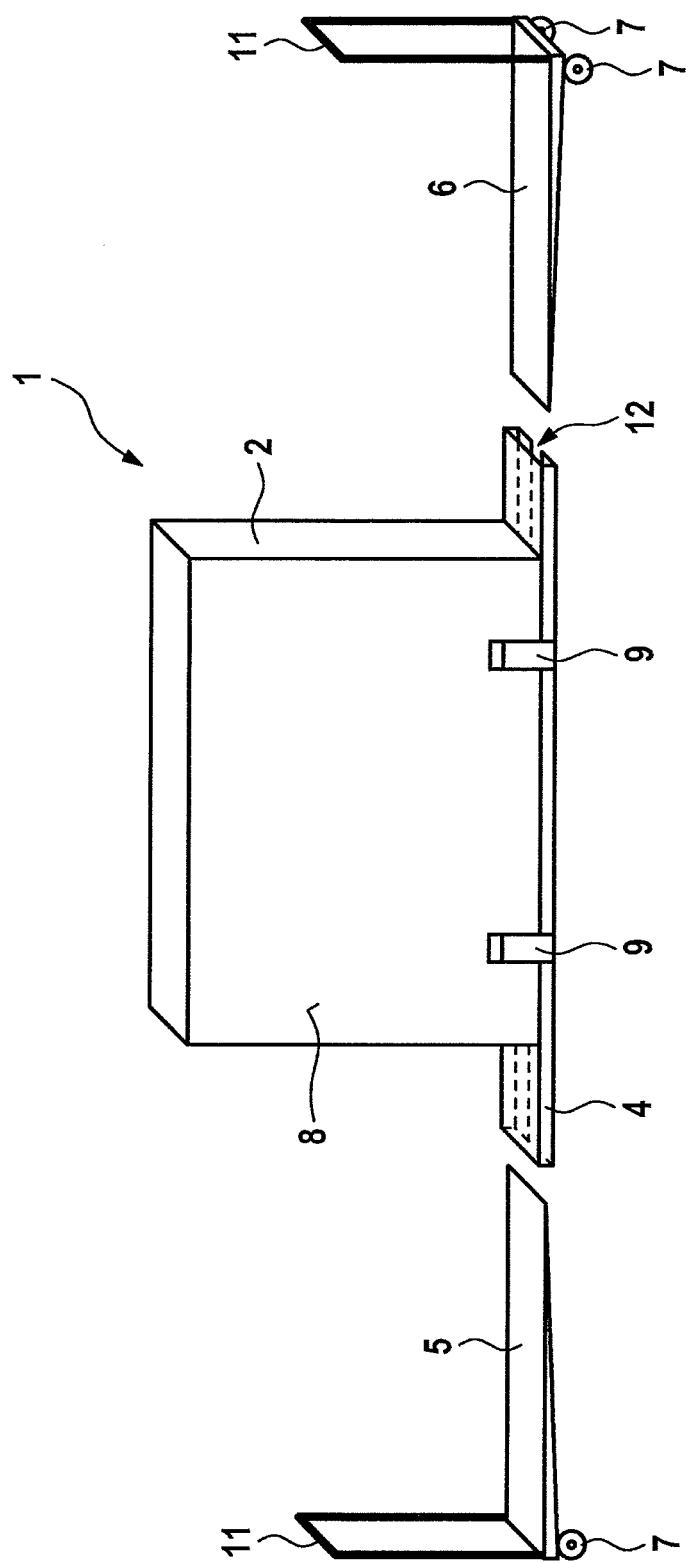
FIG. 1 shows a container having a cover, a rail and a base plate including two wedge-shaped plates with holders.

FIG. 1 shows an exemplary embodiment of a container 1 for secure enclosing and secure transport of an accumulator. In FIG. 1, a cover 2 is shown already covering an accumulator which is not depicted. A rail 4 is provided at the opening of cover 2. Rail 4 is securely connected to cover 2 via locking buckles 9. Also shown is a base plate including two separate wedge-shaped plates 5, 6. Affixed to the two plates 5, 6 are rollers 7 on which the two plates 5, 6 may be rolled and brought into the desired position. The front end of each of the two plates 5, 6 points toward cover 2 and rail 4. The cross section of rail 4 and its insertion opening 12 are only slightly larger than the thickest cross section of the two wedge-shaped plates 5, 6, making it possible to easily insert plates 5, 6. The base area of the two plates 5, 6 is at least as large as the opening of cover 2, and larger than the base area of the accumulator. Also situated on each of the two plates 5, 6 is a slide handle 11 that extends vertically from plates 5, 6 and is tall enough to easily be reached by a standing adult person. A human or robot, for example, may use slide handle 11 to slide plates 5, 6 into rail 4 and under cover 2. In so doing, wedge-shaped plates 5, 6 facilitate the insertion into slide-in opening 12 of rail 4. Moreover, when slid into rail 4, the two plates 5, 6 slide over each other within rail 4. The two plates 5, 6 when slid together thus form the base plate and in pressing mutually against rail 4, produce a force-fit connection, i.e., one resulting from the friction between the two surfaces of the two plates 5, 6 and rail 4. Rollers 7 are attached such that they are located outside of rail 4 when the two plates 5, 6 are pushed in. Thus, rollers 7 provide an easy option for securely enclosing and securely transporting the container.

Figure 2:
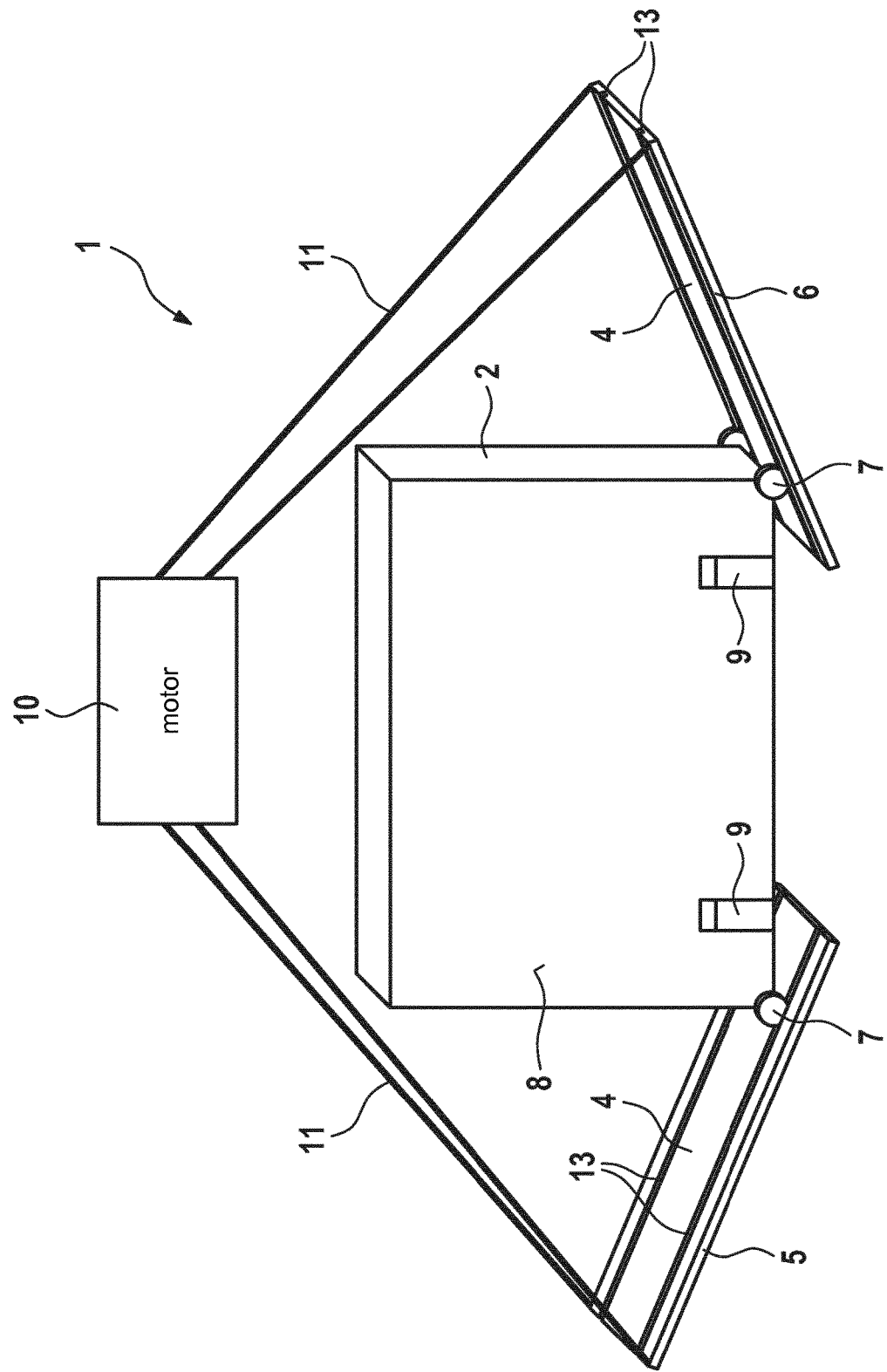
FIG. 2 shows a container having a cover and a base plate including two plates, each with a holder, the holders being attached to a motor.

FIG. 2 shows an exemplary embodiment of a container 1 for secure enclosing and secure transport of an accumulator which is in a critical condition, for example. In FIG. 2, a cover 2 is shown which already covers an accumulator which is not depicted. Rollers 7 are provided at the corners of the opening of cover 2. In addition, FIG. 2 shows a base plate including two plates 5, 6. Attached to each of the two plates 5, 6 is a rail 4. Rail 4 has two grooves 13. Thus, the distance between rollers 7 corresponds to the distance between grooves 13 of rail 4. Moreover, the thickness of rollers 7 (i.e., the extension of rollers 7 in the direction of the roller axis) corresponds to the width of groove 13 of rail 4, or groove 13 is slightly wider than the thickness of roller 7. Thus, rollers 7 provided at the corners of cover 2 may be inserted without resistance into grooves 13 of rail 4. Each of the two plates 5, 6 is connected to a motor 10 via a slide handle 11. This motor 10 is capable of sliding the two plates 5, 6 under cover 2. In the process, the two plates 5, 6 are guided like the grippers of a gripper arm under cover 2. In this case, motor 10 sets the two plates 5, 6 against two opposing sides of cover 2 and positions grooves 13 such that they abut rollers 7. At this point the two plates 5, 6 are moved by motor 10 toward one another, as a result of which rollers 7 are guided onto rail 4 within grooves 13 and cover 2 is raised slightly. Further movement of the two plates 5, 6 toward one another forces the plates 5, 6 under the accumulator. As a result, the accumulator is also raised slightly whereby the two plates 5, 6 are forced further under the accumulator and cover 2. Once the two plates 5, 6 engage each other like the grippers of a gripper arm and are positioned on top of each other, cover 2 also lies flat on the base plate thus formed. Once cover 2 is correctly positioned, cover 2 and the base plate are subsequently automatically locked with the aid of locking buckles 9 attached to side 8 of cover 2. At this point, container 1 securely encloses the accumulator and may be safely transported further with the aid of motor 10 without risk to humans and may be deposited at a desired location.

What is claimed is:

1. A container for secure enclosing and secure transport of at least one accumulator, or at least one lithium ion accumulator, comprising:
    a cover having an opening to accommodate passage of the at least one accumulator so that the cover is slidable smoothly onto the at least one accumulator to cover the at least one accumulator,
    a base plate having a surface shaped to enclose the opening of the cover, the base plate adapted to be slid underneath the accumulator,
    at least one rail with the aid of which the base plate is adapted to be slid underneath the accumulator, and
    rollers attached to the cover and/or the base plate, the rollers being attached such that the base plate rolls with the aid of the rollers as the base plate is slid underneath the accumulator,
    wherein the cover and the base plate are connectable to one another such that the at least one accumulator is securely enclosed and transportable, and
    wherein the base plate includes at least two plates, at least one slide handle being provided on the base plate, and the at least two plates of the base plate being wedge-shaped.

2. The container according to claim 1, wherein the rail is attached to the cover, the accumulator and/or the base plate.

3. The container according to claim 1, wherein the cover surrounds at least five sides of the accumulator.

4. The container according to claim 1, further comprising:
    at least one filter material provided inside the cover, the filter material adapted to absorb occurring gases, dusts and/or electrolyte quantities.

5. The container according to claim 1, wherein a connection between the cover and the base plate takes place with the aid of at least one connecting element.

6. The container according to claim 1, further comprising:
a motor controllable from outside the container, at least the one slide handle being attached to the motor.

7. The container according to claim 1, wherein the at least one accumulator is located inside a motor vehicle.

8. The container according to claim 1, wherein the rail includes an insertion opening to accommodate passage of the base plate.

9. The container according to claim 8, wherein the insertion opening has a cross section at least as large as a cross section of the base plate.

10. The container according to claim 1, wherein the base plate includes at least two plates, the at least two plates of the base plate being wedge-shaped.

11. The container according to claim 10, wherein the rail includes at least two insertion openings, each of the insertion openings accommodating passage of a different respective one of the at least two plates.

12. The container according to claim 10, wherein the at least two plates form a cuboid when pushed together.

13. The container according to claim 10, wherein the rail is configured to accommodate the at least two plates so that a friction based connection between the at least two base plates is produced.

14. The container according to claim 13, wherein another friction based connection is produced between the at least two base plates and the rail.

15. The container according to claim 1, wherein the rail is attached to the cover.

16. The container according to claim 1, wherein the rail is attached to the base plate.

17. The container according to claim 1, wherein the cover is rigid.

18. The container according to claim 1, wherein the cover is flexible.

19. A method for secure enclosing and secure transport of at least one accumulator, or at least one lithium ion accumulator, comprising:
sliding a cover onto the at least one accumulator by passing the accumulator through an opening in the cover,
sliding a base plate, having a surface shaped to enclose the opening of the cover, underneath the at least one accumulator, the base plate including at least two plates, at least one slide handle being provided on the base plate, the at least two plates of the base plate being wedge-shaped, and rollers being attached to the cover and/or base plate such that the base plate rolls with the aid of the rollers as the base plate is slid underneath the accumulator, and
connecting the cover and the base plate to one another such that the at least one accumulator is securely enclosed and transportable.

20. The method according to claim 19, further comprising:
determining whether the at least one accumulator is damaged,
wherein the sliding the cover onto the at least one accumulator, the sliding the base plate underneath the at least one accumulator, and the connecting the cover and the base plate to one another occur conditional upon determining that the at least one accumulator is damaged.

21. A container for secure enclosing and secure transport of at least one accumulator, or at least one lithium ion accumulator, comprising:
a cover having an opening to accommodate passage of the at least one accumulator so that the cover is slidable smoothly onto the at least one accumulator to cover the at least one accumulator,
a base plate having a surface shaped to enclose the opening of the cover, the base plate adapted to be slid underneath the accumulator,
at least one rail with the aid of which the base plate is adapted to be slid underneath the accumulator, and
rollers attached to the base plate, wherein the rollers are configured to be located outside the rail when the base plate is inserted into the rail,
wherein the cover and the base plate are connectable to one another such that the at least one accumulator is securely enclosed and transportable.

* * * * *